United States Patent Office 3,330,205
Patented July 11, 1967

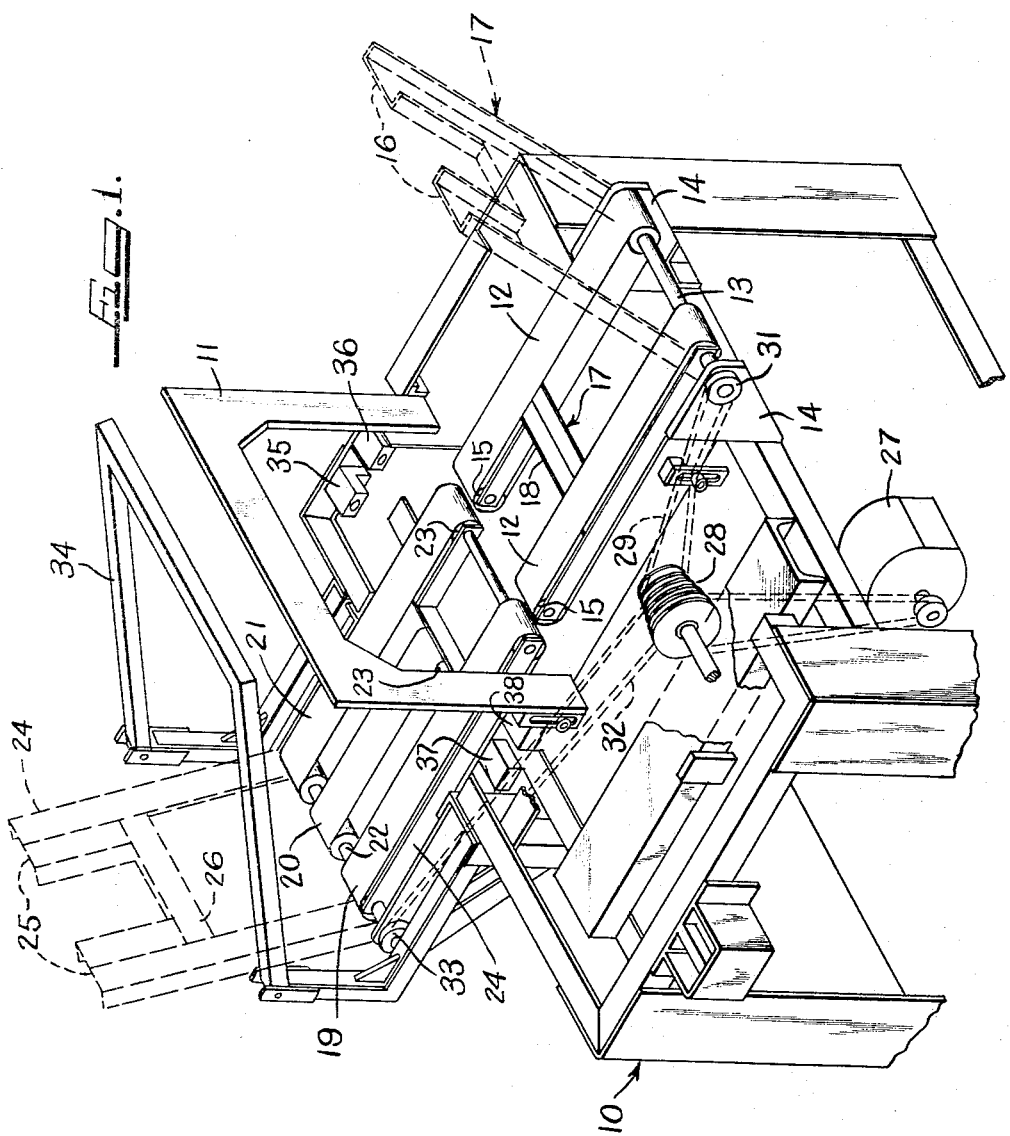

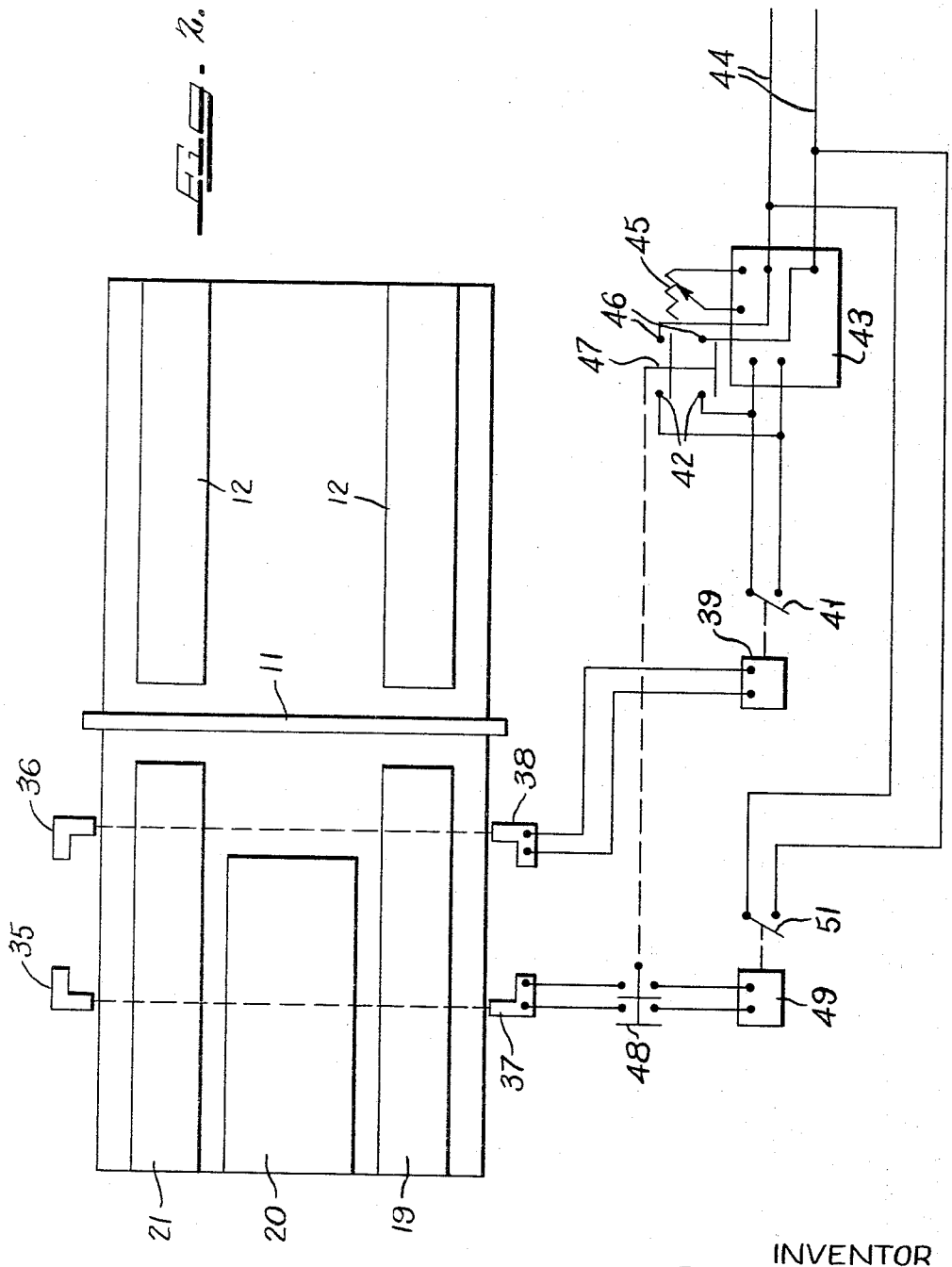

3,330,205
TYING MACHINE
Robert W. Smith, Darlington, Ind., assignor to Mid-States Steel & Wire Company, Crawfordsville, Ind., a corporation of Indiana
Filed Nov. 10, 1965, Ser. No. 507,143
3 Claims. (Cl. 100—4)

ABSTRACT OF THE DISCLOSURE

A bundle tying machine including a main frame carrying looping and knotting mechanism intermediate its ends, with sub-frames defined by upwardly opening channels pivoted on its ends and having conveyor belts mounted in the channels with the take-off conveyor belts being driven faster than the feed-on conveyor belts. Operation is automatically controlled by electric eye devices whose beam or beams are interrupted by movement of a package or article on the conveyor belts to a predetermined position to stop the conveyor belts and initiate a tying operation.

This invention relates to tying machines, and more particularly to apparatus for tying articles or bundles, such as bundles of newspapers or the like, automatically in a continuous operation.

In automatic tying of various types of articles or bundles, the articles or bundles are commonly carried over the frame of a tying machine by a conveyor which is stopped when the article or bundle is in a position to be tied and the mechanism for tying the article or bundle is then operated. One of the problems encountered with machines of this type has been the accessibility of the tying mechanism for adjustment or repair or for removal of tangled or twisted wire or cord, because the tying mechanism is generally enclosed in the frame of the machine beneath the top conveyor. Another problem has been controlling of the operation for accurately tying articles or bundles of different sizes or for tying the articles or bundles in a plurality of places spaced lengthwise thereof. The principal object of the present invention is to provide a tying machine which overcomes these difficulties.

Another object is to provide a tying machine in which the conveyors for carrying articles or bundles across the machine frame are supported on individually hinged sub-frames which can easily be swung out of the way for access to the tying mechanism.

According to a feature of the invention, the sub-frames are hinged at each end of the main frame on axes common to the driving mechanism for the conveyor belts or the like on the sub-frames to swing from horizontally aligned working positions to elevated positions extending upwardly from the ends of the main frame.

Another object is to provide a tying machine in which stopping of the conveyor mechanism and initiation of a tying operation is controlled by one or more position-sensing devices, such as photoelectric cells. For a single tying operation, adjustable time delay means are provided to stop the conveyor and initiate a tying operation a predetermined time after the leading end of the article or bundle reaches a predetermined position on the machine so that the tie can be placed in any desired location lengthwise of the article or bundle. For multiple ties, a plurality of spaced control devices are provided on the frame to stop the conveyor and initiate tying operations at different spaced points in the length of an article or bundle to be tied.

The above and other objects and advantages of the invention will be more readily apparent from the following description when read in connection with the accompanying drawing, in which:

FIGURE 1 is a perspective view with parts omitted of a tying machine embodying the invention; and
FIGURE 2 is an operating diagram of the machine of FIGURE 1.

As shown particularly in FIGURE 1, the machine comprises a frame indicated generally at 10 which is adapted to rest on a floor or the like and which is open beneath its top to support tying mechanism. Any desired type of tying mechanism, as for example that more particularly disclosed and claimed in my Patent No. 3,251,296, may be employed; but since this tying mechanism per se forms no part of the present invention it is not disclosed in detail herein. The frame carries a wire guide 11 which projects above the top of the frame and through which articles or bundles to be tied are fed lengthwise of the frame. When an article or bundle is to be tied, it is positioned within the wire guide 11 and the tying mechanism feeds a wire or similar strand around the article or bundle and ties it therearound in the manner more particularly disclosed and claimed in my patent referred to above.

According to the present invention, the articles or bundles to be tied are fed lengthwise of the frame of the tying machine by conveyor mechanisms. As shown, the articles enter the frame from any suitable feed means onto a supply conveyor consisting of two conveyor belts 12 in spaced parallel relation which run over enlarged roller portions on a driving shaft 13 journaled in brackets 14 at one end of the main frame. The other ends of the belts extend over guide rollers 15 which are journaled at the ends of channel shaped frame members 16 forming parts of a sub-frame indicated generally at 17. The sub-frame is formed by the channel shaped members 16 and by a connecting cross member 18 and is pivoted on or coaxially with the shaft 13 to swing from a horizontal position as shown in full lines in FIGURE 1 to a raised substantially vertical position as shown in dotted lines. The entrance conveyor section terminates substantially in the plane of the wire guide 11 and is spaced from the exit conveyor section described hereinafter to leave a gap through which the wire or other tying strand may pass in connection with the tying operation.

The exit conveyor is generally similar to the entrance conveyor but comprises three belts 19, 20 and 21. The belts 19 and 21 are aligned respectively with the belts 12 and the belt 20 lies between the belts 19 and 21 to insure proper engagement with an article or bundle which has been tied and whose lower surface may have been drawn into a convex shape by the tying. The belts 19, 20 and 21 run over enlarged pulley portions on a shaft 22 which is journaled in the exit end of the frame 10. At their other ends the belts run over guide pulleys 23 which are journaled in a sub-frame indicated generally at 24 and which is similar to the sub-frame 17. Thus, the sub-frame 24 comprises channel shaped end portions 25 in which the outer guide pulleys 23 are journaled and a cross member 26 in which the center guide pulley 23 is journaled. While the center guide pulley 23 has been shown as being spaced toward the discharge end of the apparatus from the end guide pulleys so that the center belt is shorter than the end belts, it will be understood that the several belts could be made coextensive in length if desired. The frame 24, in the same manner as the frame 17, is adapted to swing from a horizontal operating position aligned with the frame 17 to a raised, substantially vertical position as shown in dotted lines in FIGURE 1.

The conveyor belts are all driven by a common driving motor 27 which is mounted on the main frame and which drives a multiple sheave 28 also journaled on the main frame. One section of the sheave 28 is connected by a belt indicated at 29 to a sheave 31 on the shaft 13 to drive it. Another section of the sheave 28 is connected through a belt indicated at 32 to a driving sheave 33 on the shaft 22 to drive it. Preferably the relative sizes of the sheaves are such that the exit conveyor belts will be driven faster than the inlet conveyor belts so that articles or bundles on the apparatus will be removed rapidly after being tied and cannot interfere with the feeding of additional articles or bundles which are to be tied. When loose articles such as newspapers, magazines, or the like, are to be tied, a holddown 34 of conventional construction may be provided to press the articles in the bundle down before the tie is placed around them.

To control operation of the apparatus a control system as shown diagrammatically in FIGURE 2 and partially in FIGURE 1 may be provided. This control apparatus will function to stop the conveyors when the article or bundle to be tied is in proper registering position with the wire guide 11 and simultaneously or shortly thereafter to initiate operation of the tying mechanism. The control system comprises sensing means to sense the position of an article or bundle on the machine which may, as shown in FIGURE 1, comprise two spaced sets of photoelectric units for sensing the position of the article or bundle on the machine. Each set of photoelectric units comprises a light unit 35 or 36 and a photoelectric sensitive unit 37 or 38 to receive a light beam from the corresponding light unit. Interruption of the light beams by the presence of an article or bundle between the light unit and the corresponding photoelectric unit will initiate an operating cycle as described hereinafter.

As shown in FIGURE 2, the light unit 36 and photoelectric unit 38 are spaced a short distance downstream from the wire guide 11 at which point the tying operation takes place. The photoelectric unit 38 is connected through a switch control device 39 to close a switch 41 whenever the light beam is interrupted. The two leads from the switch 41 go into a selector unit and are connected to switch contacts 42. The selector unit 43 is energized when the switch 41 is closed to transmit an actuating control signal or pulse through leads 44 to relays or similar control devices which will stop the conveyor drive mechanism and initiate operation of the tying mechanism. The control unit 43 includes a time delay mechanism, a portion of which is formed by potentiometer 45 shown in FIGURE 2 which can be adjusted to adjust the time interval which will elapse between closing of the switch 41 and transmission of a control signal through the lines 44. It will be understood that upon completion of the tying operation the control circuit will be reset and the conveyor mechanism will be restarted by conventional control devices normally associated with tying apparatus to continue operation of the mechanism. When a single tie is to be placed around an article or bundle the contacts 42 will be open as shown and the time delay mechanism will be effective so that the position of the tie on the article or bundle can easily be adjusted by adjusting the time delay potentiometer 45.

The contacts 42 are adapted to be connected respectively to contacts 46 which are connected to the lines 44 by a switch 47. The switch 47 is connected to a similar two-pole switch 48 which is simultaneously closed with the switch 47 to connect the photoelectric unit 37 to a switch operating device 49. When the beam between the light 35 and photoelectric device 37 is broken and with the switch 48 closed, the switch operating device 49 will close a switch 51 to supply a signal direct to the lines 44. In this adjusted position of the control system with both switches 47 and 48 in their closed position, a signal will be supplied to the lines 44 as soon as the beam between the light 36 and photoelectric device 38 is interrupted by the leading edge of an article or bundle to be tied. Therefore, one tie will be placed closely adjacent to the leading edge of the article or bundle. Upon completion of this tie and restarting of the conveyors, the switch 51 will be closed as soon as the leading edge of the article or bundle interrupts the beam between light source 35 and photoelectric device 37 to place a second tie around the article or bundle spaced from the first tie. The spacing between the two ties will be controlled by the spacing between the sensing devices which may be adjustably mounted on the frame for this purpose.

While one embodiment of the invention has been shown and described in detail, it will be understood that this is for the purpose of illustration only and is not to be taken as a definition of the scope of the invention, reference being had for this purpose to the appended claims.

What is claimed is:

1. In a tying machine of the type including an elongated frame adapted to carry a knotter head and having a guide loop extending across the frame intermediate its ends to guide a tension member around an article on the frame, the improvement which comprises a pair of subframes pivoted on transverse horizontal axes adjacent to the ends of the frame for swinging from aligned horizontal positions in which they define the top of the frame to raised positions extending upwardly from the end portions of the frame, each of the sub-frames being formed by a pair of spaced parallel upwardly opening channels, conveyor means carried by the sub-frames to convey articles to be tied along the frame from one end to the other thereof comprising rollers journaled in the ends of the channels and belts trained over the rollers and lined in the channels, the outer ones of the rollers being coaxial with said horizontal axes, and power means on the frame to drive the outer rollers, the outer rollers carrying the conveyor belts which carry an article off of the frame being driven faster than the conveyor belts which carry an article onto the frame.

2. The tying machine of claim 1 including an electric eye control means on the frame whose beam is interrupted by an article being moved therealong by the conveyor means when the article is in a predetermined position to stop the conveyor means and initiate a tying operation.

3. The tying machine of claim 1 including a pair of electric eye sensing devices spaced longitudinally of the frame to produce a control signal each time an article reaches each of two different positions on the frame to interrupt the beam of said devices, and control means responsive to the control signals to stop the conveyor means and initiate a tying operation.

References Cited

UNITED STATES PATENTS

| 2,818,795 | 1/1958 | Gustafson | 100—4 |
| 3,019,577 | 2/1962 | Slamar et al. | 53—74 |
| 3,178,007 | 4/1965 | Standley et al. | 198—34 |
| 3,196,779 | 7/1965 | Embree | 100—26 X |
| 3,225,683 | 12/1965 | Rhea | 100—4 |
| 3,225,684 | 12/1965 | Smith | 100—4 |

BILLY J. WILHITE, *Primary Examiner.*